United States Patent
Tolkacz et al.

(10) Patent No.: US 9,484,605 B2
(45) Date of Patent: Nov. 1, 2016

(54) SYSTEM AND METHOD FOR USING EXHAUST GAS TO HEAT AND CHARGE A BATTERY FOR A HYBRID VEHICLE

(71) Applicant: GM GLOBAL TECHNOLOGY OPERATIONS LLC, Detroit, MI (US)

(72) Inventors: Joseph M. Tolkacz, Novi, MI (US); Brian L. Spohn, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 506 days.

(21) Appl. No.: 13/689,009

(22) Filed: Nov. 29, 2012

(65) Prior Publication Data

US 2013/0280561 A1    Oct. 24, 2013

Related U.S. Application Data

(60) Provisional application No. 61/625,963, filed on Apr. 18, 2012.

(51) Int. Cl.

| | | |
|---|---|---|
| *H01M 10/625* | (2014.01) |
| *B60W 10/26* | (2006.01) |
| *B60K 13/04* | (2006.01) |
| *B60K 1/04* | (2006.01) |
| *H01M 10/6568* | (2014.01) |
| *B60L 11/00* | (2006.01) |
| *B60L 11/12* | (2006.01) |
| *B60L 11/18* | (2006.01) |
| *H01M 10/663* | (2014.01) |
| *H01M 10/6572* | (2014.01) |
| *H01M 10/66* | (2014.01) |

(Continued)

(52) U.S. Cl.
CPC ............ *H01M 10/5016* (2013.01); *B60K 1/04* (2013.01); *B60K 13/04* (2013.01); *B60L 11/002* (2013.01); *B60L 11/12* (2013.01); *B60L 11/1875* (2013.01); *B60W 10/26* (2013.01); *H01M 10/625* (2015.04); *H01M 10/6568* (2015.04); *B60K 2001/008* (2013.01); *B60Y 2400/44* (2013.01); *H01M 10/44* (2013.01); *H01M 10/486* (2013.01); *H01M 10/5034* (2013.01); *H01M 10/5085* (2013.01); *H01M 10/5093* (2013.01); *H01M 10/5095* (2013.01); *Y02T 10/7005* (2013.01); *Y02T 10/705* (2013.01); *Y02T 10/7077* (2013.01)

(58) Field of Classification Search
CPC .................... H01M 10/5034; H01M 10/5085; H01M 10/5093; H01M 10/5095; H01M 10/5016; H01M 10/5077
See application file for complete search history.

(56) References Cited

U.S. PATENT DOCUMENTS 4,622,992 A * 11/1986 Sutherland ............... 137/504
7,384,704 B2    6/2008 Scott (Continued)

FOREIGN PATENT DOCUMENTS

| CN | 101503968 A | 8/2009 |
| CN | 101892924 A | 11/2010 |

(Continued)

*Primary Examiner* — Jeremiah Smith
(74) *Attorney, Agent, or Firm* — Quinn Law Group, PLLC (57) ABSTRACT

A system and method for using exhaust gas to heat and/or charge a battery for a hybrid vehicle is provided. The system and method use an exhaust gas heat recovery (EGHR) device to heat a heat transfer fluid. The heat transfer fluid is thermally connected to a first heat exchanger to heat the battery and/or to a second heat exchanger to charge the battery if predetermined conditions are met.

18 Claims, 3 Drawing Sheets

(51) Int. Cl.
*H01M 10/65* (2014.01)
*B60K 1/00* (2006.01)
*H01M 10/48* (2006.01)
*H01M 10/44* (2006.01)

(56) References Cited

U.S. PATENT DOCUMENTS

2008/0022681 A1* 1/2008 Tafas ............................ 60/618
2008/0311466 A1 12/2008 Yang et al.
2009/0078400 A1* 3/2009 Tamura et al. ............... 165/287
2010/0243346 A1 9/2010 Anderson et al.
2011/0206951 A1 8/2011 Ford et al.
2012/0042656 A1* 2/2012 Donnelly et al. ............. 60/772

FOREIGN PATENT DOCUMENTS

CN 102281025 A 12/2011
WO 2012010960 A1 1/2012

\* cited by examiner

SYSTEM AND METHOD FOR USING EXHAUST GAS TO HEAT AND CHARGE A BATTERY FOR A HYBRID VEHICLE

CROSS-REFERENCE TO RELATED APPLICATIONS

This application claims the benefit of U.S. Provisional Patent Application No. 61/625,963 filed on Apr. 18, 2012, the disclosure of which is hereby incorporated by reference.

TECHNICAL FIELD

The invention relates to a system and method for using exhaust gas to heat and charge a battery, such as for a hybrid vehicle.

BACKGROUND

In hybrid vehicle systems, an internal combustion engine may be combined with one or more batteries (and electric motor-generators) to form hybrid powertrains. In some configurations, the internal combustion engine may propel the front wheels while the batteries may propel the rear wheels via a motor. Current batteries, such as lithium ion batteries, may experience decreased performance when the ambient air temperature or the battery cell temperature is below a certain cold temperature such as below negative 8 degrees Celsius. The decreased performance will lead to decreased hybrid functionality such as regeneration operations and start/stop functionality. The decreased battery performance may lead to decreased all wheel drive functionality when the rear wheels are driven by a hybrid battery, such as a lithium ion battery. To improve battery performance, some hybrid systems have plug-in resistance-type heaters which warm the batteries when the hybrid battery system is plugged in for charging the batteries. However, in many locations, such as airport and other commercial and private parking lots, plug-in charging units are not available. Additionally, plug-in capability may not be offered on all hybrid models or may not connect to a battery heater. On other systems, users may let the vehicle idle to increase component temperatures, however, with lithium ion batteries, the batteries do not generally warm up while the internal combustion engine is running.

SUMMARY

A system for heating a battery in a hybrid vehicle using exhaust gas is provided. The system includes an exhaust gas heat recovery (EGHR) device for directing exhaust gas to an EGHR heat exchanger for transferring thermal energy to a heat transfer fluid. The system also includes a temperature sensor for sensing a temperature of the battery and a controller for determining that the temperature of the battery is below a predetermined temperature. The system further includes a heat exchanger, in thermal connection with a battery cover plate, for transferring thermal energy from the heat transfer fluid to the battery cover plate when the controller indicates that the temperature of the battery is below the predetermined temperature, wherein the temperature of the battery rises.

A system for heating and charging a battery in a hybrid vehicle using exhaust gas is provided. The system includes an exhaust gas heat recovery (EGHR) device having an EGHR heat exchanger for transferring thermal energy to a heat transfer fluid. The system also includes a temperature sensor for sensing a temperature of the battery, a state of charge indicator for indicating the state of charge of the battery, and a controller for monitoring a signal from the temperature sensor and a signal from the state of charge indicator. The system further includes a first heat exchanger, for thermally connecting with a battery cover plate and a second heat exchanger, for electrically charging the battery. The system further includes that the controller enables heat transfer fluid to flow to at least one of the first heat exchanger and the second heat exchanger based on the temperature and the state of charge of the battery.

A method for heating and charging a battery having a battery cover plate in a hybrid vehicle using exhaust gas having thermal energy and heat transfer fluid in a heat transfer loop including a first heat exchanger, a second heat exchanger and a thermoelectric device is provided. The method includes determining a temperature of the battery, determining a state of charge of the battery, and thermally connecting the exhaust gas having thermal energy to the heat transfer fluid. The method continues with thermally connecting the first heat exchanger to the heat transfer fluid if the temperature of the battery is below one of a first predetermined temperature and a second predetermined temperature so that the first heat exchanger receives heat transfer fluid and thermally connects to the battery cover plate so that the temperature of the battery rises and thermally connecting the second heat exchanger to the heat transfer fluid if the temperature of the battery is between the first predetermined temperature and the second predetermined temperature and a state of charge of the battery is below a predetermined state of charge so that the second heat exchanger receives the heat transfer fluid and thermally connects to the thermoelectric device which causes a current to flow charging the battery so the state of charge of the battery rises.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1A:
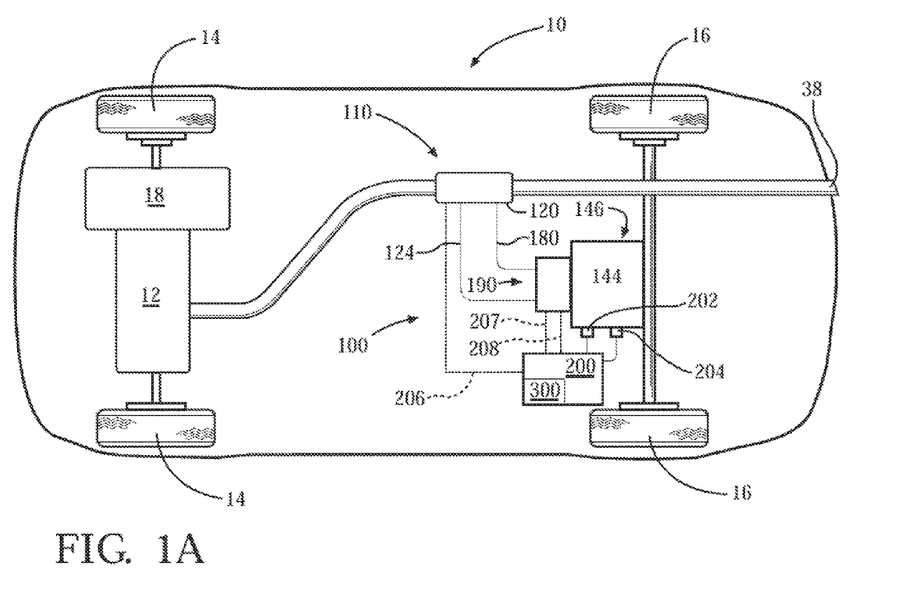
FIGS. 1A and 1B are schematic illustrations of the underside of a hybrid vehicle, including the system for using exhaust gas to heat and charge a battery.
Figure 1B:
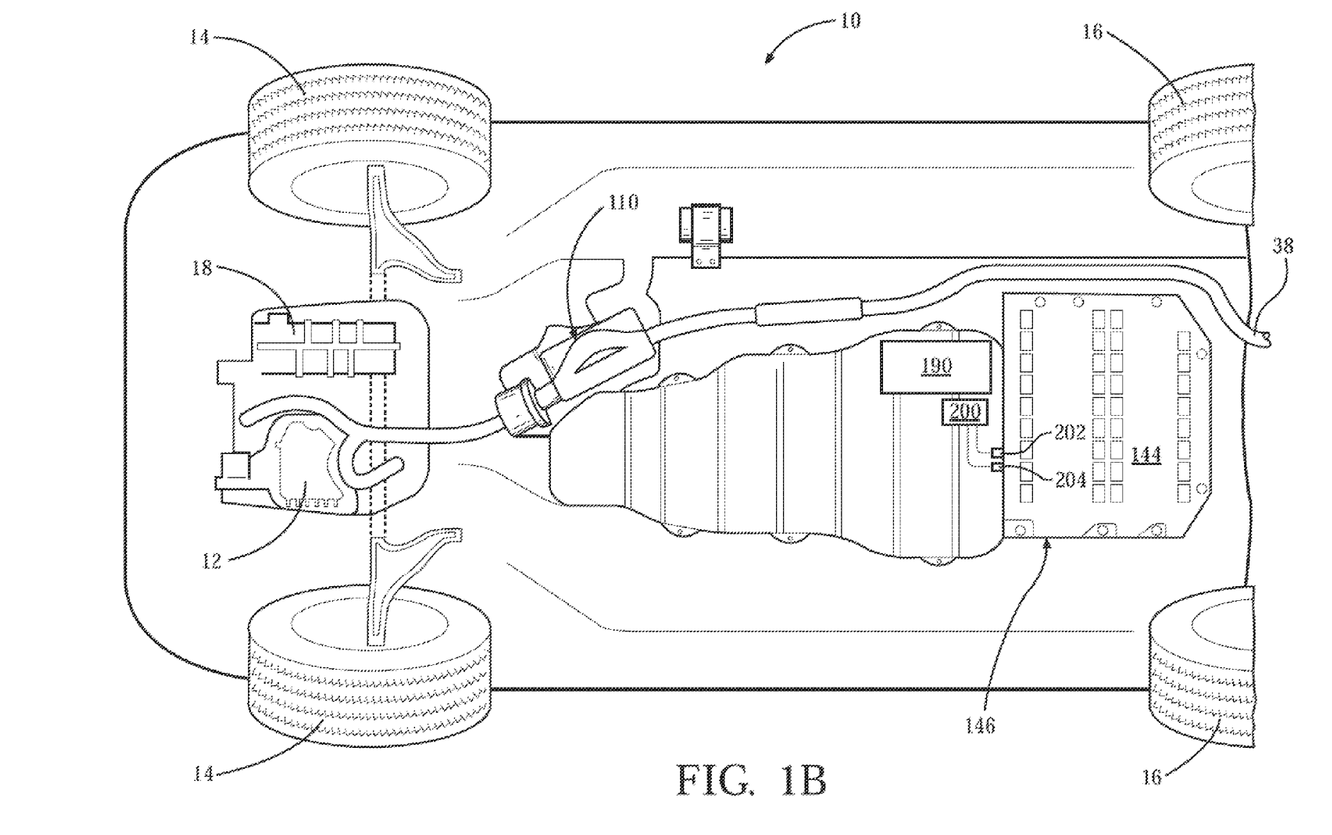

Referring to the drawings, wherein like reference numbers refer to like components throughout the several views, FIGS. 1A and 1B show schematic illustrations of the underside of a hybrid vehicle 10, such as a hybrid electric vehicle (HEV). FIG. 1A shows the hybrid vehicle 10 with the system 100 of the present invention shown in detail while FIG. 1B shows system components such as the EGHR device 110 and the heat transfer loop 190 with some connections not shown, to allow other components of the hybrid vehicle 10 to be clearly seen. The hybrid vehicle 10 includes an internal combustion engine 12, such as a spark or compression ignition type engine, configured to generate power and adapted for driving front wheels 14 through transmission/drive train 18 to propel the hybrid vehicle 10. Internal combustion engine 12 includes many other conventional components which are not shown but the existence of which are known and appreciated by those skilled in the art. The battery 146 mounted toward the rear of the hybrid vehicle 10 (along with an electric motor, not shown) drive rear wheels 16. Having separate drive mechanisms enables the hybrid vehicle 10 to be operated in all wheel drive (AWD), which is known to improve vehicle handling during snowy or other weather conditions commonly associated with lower ambient air temperatures. During engine operation, the internal combustion engine 12 emits post-combustion gases to the ambient via an exhaust system 38. The exhaust system 38 includes many other conventional components which are not shown but the existence of which are known and appreciated by those skilled in the art. The exhaust gas includes heat or thermal energy developed in the combustion process.

Figure 2:
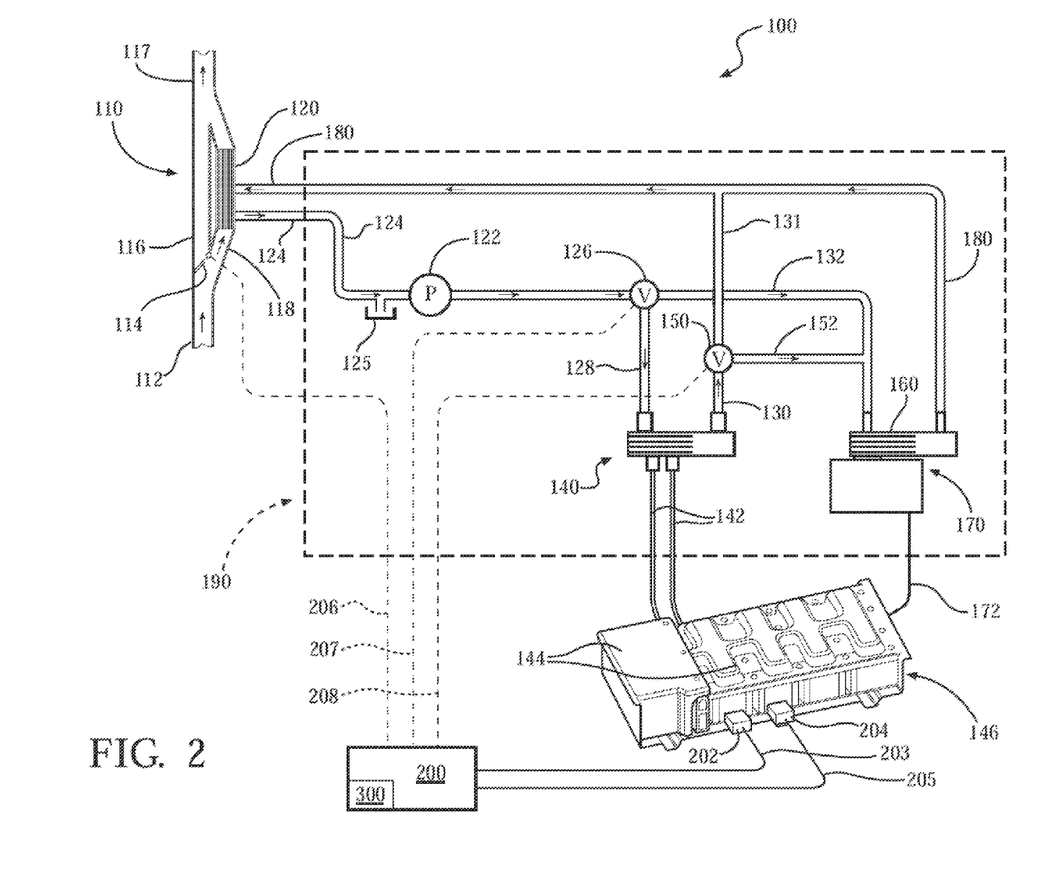
FIG. 2 is a schematic illustration of the system for using exhaust gas to heat and charge a battery in the hybrid vehicle of FIGS. 1A and 1B.

Referring to FIGS. 1A, 1B and 2 generally as an overview, the system 100 comprises an EGHR heat exchanger 120 in the exhaust system 38, a first heat exchanger 140 for heating the battery 146, and a second heat exchanger 160 for providing heat to a thermoelectric device 170 for charging the battery 146. The system 100 also includes a fluid circulating arrangement of fluid feed lines 124, 128, 130, 132 and 152 and fluid return lines 131 and 180 between the EGHR, first, and second heat exchangers 120, 140, and 160. The heated fluid flowing in these lines is directed by a first fluid flow control valve 126 for heating the battery 146 and a second fluid flow control valve 150 for charging the battery 146. To achieve the desired results, first and second fluid flow control valves 126 and 150, respectively, are controlled to cooperate so that the amount or amounts of heated fluid in fluid feed line 124 to be distributed to either one or both of the first and second heat exchangers 140 and 160 depends on at least one of the temperature of the battery 146 and the state of charge of the battery 146.

In particular and as shown in FIG. 1A, the system 100 for heating and charging a battery may be connected to the exhaust system 38. An exhaust gas heat recovery (EGHR) device 110 is connected to the exhaust system 38, for example, near the battery 146 which the exhaust gas will be used to heat and charge. Placement of the EGHR device 110 anywhere along the exhaust system 38 is possible in accordance with the present invention. Placement nearer the internal combustion engine 12 may provide less heat loss in the system while placement nearer the battery 146 may improve system response time as shorter fluid feed and return lines (having less fluid mass) are required to reach the battery 146. By placing the EGHR device 110 nearer the internal combustion engine 12 than the battery 146, more heat may be maintained in the exhaust gas and thus more heat may be delivered to the battery 146. The EGHR device 110 is a device that has been used to capture exhaust gas having thermal energy and use it for heating engine coolant and transmission fluids in systems with an internal combustion engine. The EGHR device 110 includes an EGHR heat exchanger 120. Flowing in thermal connection or heat-exchange communication with the EGHR heat exchanger 120, heat transfer fluid flows and circulates through fluid lines such as fluid feed line 124 and fluid return line 180 of the heat transfer loop 190, shown generally in FIG. 1A and in greater detail in FIG. 2. The term heat-exchange communication refers to purposeful, direct heat exchange between two or more fluids through a heat exchanger device. Still referring to FIG. 2, the fluid return line 180 of the heat transfer loop 190 returns used heat transfer fluid to the EGHR device 110 for reuse or recirculation in the system 100 as required. Pump 122 may provide the flow or circulation between fluid feed line 124 and fluid return line 180. A controller 200 may be mounted near the battery 146 or anywhere else in the hybrid vehicle 10 to receive signals on signal lines 203 and 205 from a battery temperature sensor 202 and battery state of charge (SOC) indicator 204, respectively. Although shown as wired from the battery temperature sensor 202 and the battery state of charge indicator 204 to the controller 200, respectively, signal lines 203 and 205 may be included in a serial data cable including other data from a battery controller, may be wireless channels for transmitting signals, or may use other known techniques for sending signals to the controller 200. (Throughout this description, the term signal line may include any devices for sending signals as are known by those skilled in the art.) The controller 200 may then send signals, such as on signal line 206, to the EGHR device 110 and, such as on signal lines 207 and 208, to the first and second fluid flow control valves 126 and 150, respectively, in the heat transfer loop 190, to carry out the method of the present invention. The controller 200 may include one or more components (not separately shown) with a storage medium and a suitable amount of programmable memory, capable of executing one or more algorithms or methods to effect control of the devices as described, including the method 300 of FIG. 3 in accordance with the present invention. The controller 200 may be part of an existing controller as are used in multiple vehicle applications.

A more detailed schematic illustration of the system 100 of the present invention is shown in FIG. 2. Exhaust gas flows into the EGHR device 110 through exhaust gas line 112. A diverter valve or switch 114 directs the exhaust gas into exhaust gas line 118 to be used in EGHR heat exchanger 120 or into exhaust gas line 116. In either event, exhaust gas eventually enters the exhaust gas exit line 117 and leaves the hybrid vehicle 10 through the vehicle exhaust system 38 (shown in FIGS. 1A and 1B). The diverter valve or switch 114 may be spring driven, such as a bimetallic spring in a deck house hold thermometer; controlled by a wax motor; or any other suitable switch or valve for use in such exhaust gas system, and may be responsive to a signal over signal line 206 from the controller 200, such as an electrically actuated valve like an engine throttle control valve.

Still referring to FIG. 2, when exhaust gas is directed through the EGHR heat exchanger 120, the heat transfers to heat transfer fluid in fluid feed line 124 of the heat transfer loop 190 of the system 100. Fluid feed line 124 connects to the pump 122 for maintaining pressure and/or flow in the fluid lines of the heat transfer loop 190 regardless of the state of the internal combustion engine 12. (Pump 122 may be located in several different locations in heat transfer loop 190 but must be connected in the system to maintain the desired pressure and/or flow of the circulating fluid in the feed and return fluid lines.) One skilled in the art will recognize that a system without pump 122 may provide some heat transfer as the thermal system naturally moves toward equilibrium and may be used if desired. A fluid reservoir 125 including an overflow bottle and/or a pressure cap may be included as is known in typical heat transfer systems. The fluid reservoir 125 may be pressurized or non-pressurized to achieve desired results. As is known in the art, the thermal system may include vent lines or air separators for deaeration in addition to the fluid reservoir 125 used for thermal expansion. These optional devices may be required depending on the heat transfer fluid used, which may, for example only, be a 50/50 glycol/water fluid as well as other known fluids for achieving desired results.

Next the heat transfer fluid flows into a first fluid flow control valve 126 which may be a standard fluid flow directing valve or diverter which may be electrically operated, fluid operated or operated in any suitable manner to move between positions. For example, the first fluid flow control valve 126 may be responsive to a signal over signal line 207 from the controller 200. Depending on indications from the controller 200, the heat transfer fluid may then flow towards a second fluid flow control valve 150 which may also be a standard fluid flow directing valve or diverter which may be electrically operated, fluid operated or operated in any suitable manner to move between positions. For example, the second fluid flow control valve 150 may be responsive to a signal over signal line 208 also from the controller 200. The first fluid flow control valve 126 directs substantially all of the heat transfer fluid through fluid line 128 into the first heat exchanger 140 if the controller 200, through signal line 207, indicates that the temperature of the battery 146 (as sensed by a temperature sensor 202 mounted on the battery 146) is below a predetermined temperature T1 (such as negative 10 degrees Celsius, for example only). Alternatively, the first fluid flow control valve 126 may use other ways as discussed above to determine when to adjust position. The temperature sensor 202 is illustrative only and may include multiple sensors of different types as desired. The first heat exchanger 140 may be a liquid stacked heat exchanger which is formed of stacked plates through which the fluids transferring the heat flow. In accordance with the current invention, the fluid transfer could be fluid to fluid or fluid to air depending on desired design criteria. Depending on the media used, fluid lines 142 conduct heat recovered in the heat exchanger 140 to the battery cover plate 144 which is formed of a thermally conductive material such as aluminum, etc. to distribute the heat across the battery 146 raising the temperature of the battery 146 (as sensed by temperature sensor 202) and thus, the battery performance to acceptable levels, even though ambient air temperature remains very cold. After travelling through heat exchanger 140, heat transfer fluid returns through fluid feed line 130 and with the second fluid flow control valve 150 in a first position through fluid return lines 131 and 180 back to the EGHR heat exchanger 120.

If the temperature sensor 202 indicates that the temperature of the battery 146 is between two predetermined temperatures T1 and T2 (such as between negative 10 degrees Celsius and 15 degrees Celsius, for example only) and the state of charge indicator 204 of the battery 146 is less than a predetermined level SOC1 (such as 80 percent, for example only), then the first fluid flow control valve 126, in a second position, opens an additional fluid feed line 132 and with the second fluid flow control valve 150, in a second position, directs some of the heat transfer fluid to flow through fluid feed line 152. As discussed previously, the second flow control valve 150 may be electrically operated, fluid operated or operated in any suitable manner to move between positions. The heat transfer fluid in fluid feed line 152 enters the heat exchanger 160 for transferring heat to the thermoelectric device 170 of the heat transfer loop 190. The thermoelectric device 170 may be composed of a skutterudite material, TAGs, PbTe, BiTe or other materials that have properties such that when heat is introduced, a current is formed which can be conveyed by electrical line 172 to the battery 146. As is known in the art, the thermoelectric device 170 may be a Peltier generator which uses a temperature difference between two plates to build a difference in voltage between the two plates. The resulting current flowing in electrical line 172 may be used to charge the battery 146. The state of charge indicator 204 sends a signal to the controller 200 which varies with the charge level of the battery 146.

If the temperature sensor 202 indicates that the battery temperature is above a predetermined temperature T2 (such as 15 degrees Celsius, for example only), then the controller 200 checks the state of charge indicator 204. If the state of charge of the battery 146 is below a predetermined level SOC1 (such as 80 percent, for example only), then the first and second fluid flow control valves 126 and 150, respectively, will adjust positions, with the first fluid flow control valve 126, in a third position, so that substantially all of heat transfer fluid in fluid feed line 124 flows to the heat exchanger 160. The heat from the heat exchanger 160 may then enable the thermoelectric device 170 to charge the battery 146. When the state of charge (SOC) indicator 204 indicates that the battery 146 is charged to a predetermined level (such as 80 percent, for example only), then the diverter valve or switch 114 of the EGHR device 110 changes positions, diverting substantially all of the exhaust gas to an exhaust line 116 and not to the EGHR heat exchanger 120. (Arrows are shown on the above described fluid lines to show general directions of flow when the fluid lines are being used; i.e. when the first and second fluid flow control valves 126, 150 are in a position for heat transfer fluid to flow in the fluid lines.) As described above, the diverter valve or switch 114 of the EGHR device 110 may be thermal mechanical, exhaust pressure or flow, or electrically activated as desired.

Figure 3:
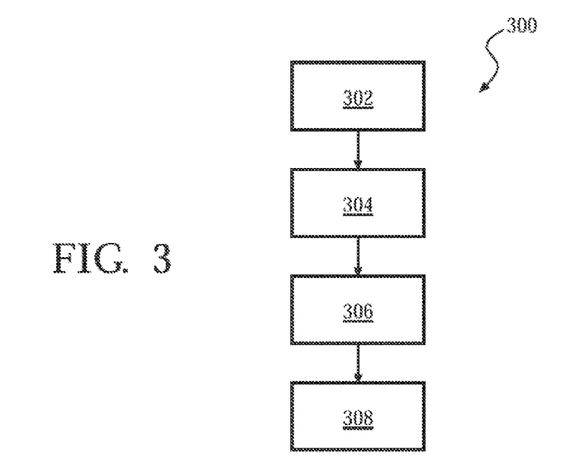
FIG. 3 is a flowchart for the method of using exhaust gas to heat and charge a battery for the hybrid vehicle of FIGS. 1A and 1B.

A method 300 of heating and charging a battery using exhaust gas is shown in FIG. 3. FIG. 3 shows only a high-level diagram of the method 300, and it is recognized that the method of FIG. 3 may be a portion or a subroutine of another algorithm or method. First, an overview of the method of the present invention is provided, and then a more detailed description of the method 300 follows. Referring to FIGS. 2 and 3, the method 300 begins in step 302 by determining the temperature and/or state of charge of the battery 146. Next, in step 304, if the battery temperature and/or state of charge are below predetermined values, then exhaust gas thermal energy is transferred to the heat transfer fluid. Otherwise, the exhaust gas continues through the exhaust gas exit line 117 of the exhaust system 38. Next in steps 306 and 308, fluid control valves 126 and 150 are operated to send heat or thermal energy to either or both of the heat exchangers 140 and 160 depending on the temperature and/or state of charge of the battery 146. Once the temperature and/or the state of charge of the battery 146 are above the predetermined values, the exhaust gas continues through the exhaust gas exit line 117 of the exhaust system 38 and the method 300 ends.

Referring to FIGS. 2 and 3, a more detailed description of the method 300 is provided. The method 300 begins, in step 302, by determining a temperature of the battery 146 using the battery temperature sensor 202 and a state of charge of the battery 146 using the state of charge indicator 204. Next, in step 304, the method 300 includes thermally connecting exhaust gas to the EGHR heat exchanger 120 for transferring exhaust gas thermal energy to a heat transfer fluid in a heat transfer loop 190 if either the temperature of the battery 146 is below the second predetermined temperature T2 or the state of charge of the battery 146 is below the predetermined level SOC1. Next in step 306, the method 300 continues with opening the first fluid flow control valve 126 to either the first position if the temperature of the battery 146 is below the first predetermined temperature T1 which is lower than the second predetermined temperature T2 so substantially all of the heat transfer fluid flows to the first heat exchanger 140, the second position if the temperature of the battery 146 is higher than the first predetermined temperature T1 and lower than the second predetermined temperature T2 and the state of charge of the battery 146 is below the predetermined level SOC1, so the heat transfer fluid flows to both of the first heat exchanger 140 and the second heat exchanger 160, or the third position if the temperature of the battery 146 is higher than the second predetermined temperature T2 and the state of charge of the battery 146 is below the predetermined level SOC1. The first heat exchanger 140 receives heat transfer fluid and thermally connects to a battery cover plate 144 for heating the battery 146 so that the temperature of the battery 146 rises. Then in step 308, the method continues with opening the second flow control valve 150 to either the first position so the heat transfer fluid flows to both the first heat exchanger 140 and the second heat exchanger 160 when the controller 200 determines that the temperature of the battery 146 is between the first predetermined temperature T1 and the second predetermined temperature T2 and the state of charge is below the predetermined level SOC1 and the second position so substantially all of the heat transfer fluid flows to the second heat exchanger 160 when the controller 200 determines that the temperature of the battery 146 is above the second predetermined temperature T2 and the state of charge is below the predetermined level SOC1. The second heat exchanger 160 receives heat transfer fluid and thermally connects to the thermoelectric device 170 which causes a current to flow charging the battery 146 so that the state of charge level or percentage rises. Finally, the method 300 ends after step 308.

The system and method of the present invention uses exhaust gas thermal potential to improve the performance of the battery in a hybrid electric vehicle. Use of this thermal potential may eliminate the need for a plug-in heater to warm the battery during operation in very cold ambient air. Also during very cold ambient air temperature situations or other situations when the temperature of the battery cell is below a desired temperature, the system and method of the present invention may need to force the internal combustion engine 12 on to produce exhaust gas so that the performance of the battery 146 may be improved. This "engine on" override may be a signal from the controller 200 or from other systems in the vehicle 10 and basically forces the internal combustion engine 12 to run so the resultant exhaust gas thermal potential may be used to improve battery 146 performance by raising the battery temperature using the system and method described hereinabove.

The controller 200 may be used to collect all or some of the signals for use with the present invention and also may send signals to effect the desired steps of the method 300. Alternatively individual devices such as the first and second fluid flow control valves 126 and 150, respectively, may have internal mechanisms which cause them to be positioned as needed to effect the method 300 of the present invention. The method steps of the present invention may be looped to be performed as many times as needed to effect desired battery temperature and/or state of charge level.

The predetermined temperatures and the predetermined SOC level or percentage are exemplary and illustrative only. The specific values for setpoints will be determined based upon specific configurations of the system 100 and the vehicle into which it is incorporated.

The method 300 of the present invention provides for heating the battery 146 to a predetermined temperature before beginning to charge the battery 146 as it is known that when a battery 146 is very cold, the rate of electrical power that can be accepted by the battery 146 may be limited.

The EGHR heat exchanger 120 is shown in concentric-flow configuration such that both fluids (exhaust gas and heat transfer fluid) flow substantially parallel to each other and to the length of the heat exchanger 120. The flow orientation will depend on packaging constraints, type of fluid used, etc. The first and second fluid flow control valves 126 and 150, respectively, are described with a certain number of positions but may have additional positions for use with other systems or methods as is known in the art.

Throughout the present description, the term battery 146 and batteries may be used interchangeably to indicate many battery cells in a battery pack.

Although a hybrid electric vehicle 10 is shown, any vehicle employing an internal combustion engine 12 and a battery 146 used as described is within the scope of the present invention. Additionally, although the hybrid electric vehicle 10 is shown with an electric AWD system, one skilled in the art will recognize the invention may be readily used in a Front Wheel Drive (FWD) or Rear Wheel Drive (RWD) system within the scope of the present invention. The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A system for heating and charging a battery in a hybrid vehicle using exhaust gas comprising:
   an exhaust gas heat recovery (EGHR) device having an EGHR heat exchanger configured to transfer thermal energy to a heat transfer fluid;
   a temperature sensor configured to sense a temperature of the battery;
   a state of charge indicator configured to indicate the state of charge of the battery;
   a first heat exchanger configured to receive the thermal energy from the heat transfer fluid and transfer the thermal energy to the battery cover plate so that the temperature of the battery rises; and
   a thermoelectric device configured to generate a current to charge the battery;
   a second heat exchanger configured to receive the thermal energy from the heat transfer fluid and transfer the thermal energy to the thermoelectric device such that the thermal energy creates a temperature difference in the thermoelectric device which causes generation of the current to charge the battery so that the state of charge of the battery rises;
   a controller configured to monitor the temperature of the battery from the temperature sensor and the state of charge of the battery from the state of charge indicator to determine whether to transfer the heat transfer fluid to at least one of the first and second heat exchangers;
   a first fluid flow control valve configured to control the flow of the heat transfer fluid in response to the controller, and having a first position in which substantially all of the heat transfer fluid is transferred to the first heat exchanger, a second position in which the heat transfer fluid is transferred to both the first heat exchanger and the second heat exchanger, and a third position in which substantially all of the heat transfer fluid is transferred to the second heat exchanger;

a second fluid flow control valve configured to control the flow of the heat transfer fluid in response to the controller, and having a first position in which the heat transfer fluid is transferred to both the EGHR heat exchanger and the second heat exchanger, and a second position in which substantially all of the heat transfer fluid is transferred to the second heat exchanger;

wherein the controller is configured to:
  signal the first fluid control valve to operate in the first position if the temperature of the battery is below a first predetermined temperature,
  signal the first fluid control valve to operate in the second position if the temperature of the battery is between the first predetermined temperature and a second predetermined temperature and the state of charge of the battery is below a predetermined level,
  signal the first fluid control valve to operate in the third position if the temperature of the battery is greater than the second predetermined temperature and the state of charge of the battery is below the predetermined level,
  signal the second fluid control valve to operate in the first position if the temperature of the battery is between the first predetermined temperature and the second predetermined temperature and the state of charge of the battery is below the predetermined level, and
  signal the second fluid control valve to operate in the second position if the temperature of the battery is above the second predetermined temperature and the state of charge of the battery is below the predetermined level.

2. The system of claim 1 wherein the controller signals a switch in the EGHR device for directing exhaust gas to the EGHR heat exchanger.

3. The system of claim 1 including a heat transfer loop having fluid lines wherein the heat transfer fluid is located in the fluid lines of the heat transfer loop and further including a pump for maintaining flow in the fluid lines of the heat transfer loop.

4. The system of claim 1 including an internal combustion engine to produce exhaust gas having thermal energy for use in the EGHR device.

5. The system of claim 4 wherein the EGHR device is mounted closer to the internal combustion engine than to the battery so as to provide more thermal energy to the heat transfer fluid.

6. The system of claim 1 wherein the first heat exchanger is a liquid stacked heat exchanger.

7. The system of claim 1 wherein the thermoelectric device is a Peltier generator.

8. The system of claim 7 wherein the Peltier generator includes a pair of plates that the temperature difference occurs between.

9. The system of claim 7 wherein the Peltier generator includes a pair of plates such that the thermal energy creates the temperature difference between the plates to build a difference in voltage which causes the generation of the current.

10. The system of claim 1 wherein the thermoelectric device includes a pair of plates that the temperature difference occurs between.

11. The system of claim 1 wherein the thermoelectric device includes a pair of plates with the thermal energy creating the temperature difference between the plates to build a difference in voltage which causes the generation of the current.

12. The system of claim 1 wherein the thermoelectric device includes a pair of plates, with the thermal energy creating the temperature difference between the plates to build a difference in voltage to directly generate the current.

13. The system of claim 1 wherein the first and second heat exchangers are disposed upstream to the thermoelectric device relative to the direction of flow of the heat transfer fluid.

14. The system of claim 1 wherein the first fluid flow control valve is disposed between the EGHR heat exchanger and the first heat exchanger in the direction of flow of the heat transfer fluid, and wherein the second fluid flow control valve is disposed between the first and second heat exchangers in the direction of flow of the heat transfer fluid.

15. The system of claim 1 wherein the thermoelectric device includes a material that creates the current when the thermal energy is introduced to the thermoelectric device from the second heat exchanger.

16. A method for heating and charging a battery having a battery cover plate in a hybrid vehicle using thermal energy recovered by an exhaust gas heat recovery (EGHR) device having an EGHR heat exchanger configured to transfer the thermal energy to a heat transfer fluid in a heat transfer loop including a first heat exchanger, a second heat exchanger and a thermoelectric device, the method comprising:
  determining a temperature of the battery;
  determining a state of charge of the battery;
  thermally connecting the exhaust gas having thermal energy to the heat transfer fluid;
  thermally connecting the first heat exchanger to the heat transfer fluid if the temperature of the battery is below one of a first predetermined temperature and a second predetermined temperature so that the first heat exchanger receives the heat transfer fluid and thermally connects to the battery cover plate so that the temperature of the battery rises; and
  thermally connecting the second heat exchanger to the thermoelectric device such that the thermal energy from the second heat exchanger creates a temperature difference in the thermoelectric device which causes generation of a current to charge the battery so the state of charge of the battery rises;
  wherein the heat transfer loop further includes a first fluid flow control valve configured to control the flow of the heat transfer fluid in response to a controller and a second fluid flow control valve configured to control the flow of the heat transfer fluid in response to the controller, the method further comprising:
  opening the first fluid flow control valve to one of:
    a first position if the temperature of the battery is below the first predetermined temperature which is lower than the second predetermined temperature such that substantially all of the heat transfer fluid flows to the first heat exchanger,
    a second position if the temperature of the battery is higher than the first predetermined temperature and lower than the second predetermined temperature and the state of charge of the battery is below the predetermined level such that the heat transfer fluid flows to both of the first heat exchanger and the second heat exchanger, and
    a third position if the temperature of the battery is greater than the second predetermined temperature and the state of charge of the battery is below the predetermined level such that substantially all of the heat transfer fluid flows to the second heat exchanger; and opening the second fluid flow control valve to one of:
- a first position in which the heat transfer fluid flows to both the EGHR heat exchanger and the second heat exchanger if the temperature of the battery is between the first predetermined temperature and the second predetermined temperature and the state of charge is below the predetermined level, and
- a second position in which substantially all of the heat transfer fluid flows to the second heat exchanger if the temperature of the battery is above the second predetermined temperature and the state of charge is below the predetermined level.

17. The method of claim 16 wherein thermally connecting the first heat exchanger to the heat transfer fluid continues until the temperature of the battery is above the second predetermined temperature.

18. The method of claim 16 wherein thermally connecting the second heat exchanger to the heat transfer fluid continues until the state of charge of the battery is above the predetermined level.

\* \* \* \* \*